(12) United States Patent
Bonds et al.

(10) Patent No.: US 6,786,638 B1
(45) Date of Patent: Sep. 7, 2004

(54) IN-SITU STANDARD FOR TEMPERATURE INDICATING LABELS

(75) Inventors: James R. Bonds, Davie, FL (US); Richard B. Barrett, Chatham, NJ (US)

(73) Assignee: Cordis Corporation, Miami Lakes, FL (US)

( * ) Notice: Subject to any disclaimer, the term of this patent is extended or adjusted under 35 U.S.C. 154(b) by 0 days.

(21) Appl. No.: 09/556,200

(22) Filed: Apr. 21, 2000

Related U.S. Application Data

(60) Provisional application No. 60/131,615, filed on Apr. 28, 1999.

(51) Int. Cl.$^7$ ................................................ G01K 11/00
(52) U.S. Cl. .................... 374/162; 374/160; 374/106; 116/217; 116/219
(58) Field of Search ................. 374/104, 106, 374/160–162, 208; 116/206–207, 216–219

(56) References Cited

U.S. PATENT DOCUMENTS

| | | | | | |
|---|---|---|---|---|---|
| 3,568,627 A | * | 3/1971 | Selinger et al. | ............. | 116/207 |
| 4,057,029 A | * | 11/1977 | Seiter | ......................... | 116/207 |
| 4,180,009 A | * | 12/1979 | Voss et al. | ................... | 116/206 |
| 4,280,441 A | * | 7/1981 | McNeely | ..................... | 116/219 |
| 4,428,321 A | * | 1/1984 | Arens | .......................... | 116/217 |
| 4,432,656 A | * | 2/1984 | Allmendinger | ............. | 374/102 |
| 4,459,046 A | * | 7/1984 | Spirg | .......................... | 374/162 |
| 4,538,926 A | * | 9/1985 | Chretien | ...................... | 374/150 |
| 4,888,219 A | * | 12/1989 | Barnes | ........................... | 428/1 |
| 4,929,090 A | | 5/1990 | Grahm | | |
| 5,158,363 A | * | 10/1992 | Speelman et al. | .......... | 374/102 |
| 5,188,457 A | | 2/1993 | O'Hara | | |
| 5,476,792 A | | 12/1995 | Ezrielev et al. | | |
| 5,487,276 A | * | 1/1996 | Namisniak et al. | ......... | 116/308 |
| 5,667,303 A | * | 9/1997 | Arens et al. | ................. | 374/102 |
| 5,709,472 A | * | 1/1998 | Prusik et al. | ................ | 374/106 |
| 5,719,828 A | * | 2/1998 | Haas et al. | ................... | 116/200 |
| 5,795,065 A | | 8/1998 | Barham | | |
| 5,912,204 A | | 6/1999 | Yamada et al. | | |
| 5,997,927 A | | 12/1999 | Gics | | |
| 6,042,264 A | * | 3/2000 | Prusik et al. | ................ | 374/106 |
| 6,103,351 A | * | 8/2000 | Ram et al. | ................... | 374/162 |
| 6,214,623 B1 | * | 4/2001 | Simons et al. | .............. | 116/207 |
| 6,564,742 B2 | * | 5/2003 | Perner et al. | ................ | 116/216 |

\* cited by examiner

*Primary Examiner*—Christopher W. Fulton
*Assistant Examiner*—Yaritza Guadalupe
(74) *Attorney, Agent, or Firm*—Pitney Hardin LLP

(57) ABSTRACT

The temperature indicating surface, typically a label, includes an irreversibly fusible coating which changes from a first appearance to a second appearance in response to exposure to a threshold temperature or rated temperature. An in situ standard is provided by initially fusing selected areas of the temperature indicating surface so that a pattern is visible prior to exposure to the threshold temperature. Upon exposure to the threshold temperature, however, the entire temperature indicating surface is fused thereby presenting a uniform appearance and unambiguous evidence of prior exposure to the threshold temperature.

14 Claims, 3 Drawing Sheets

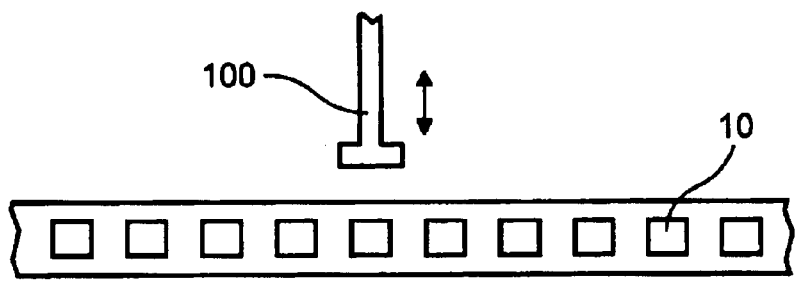
F I G. 3
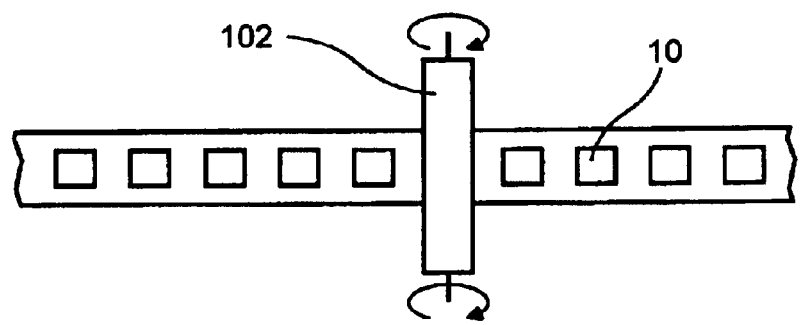
F I G. 4
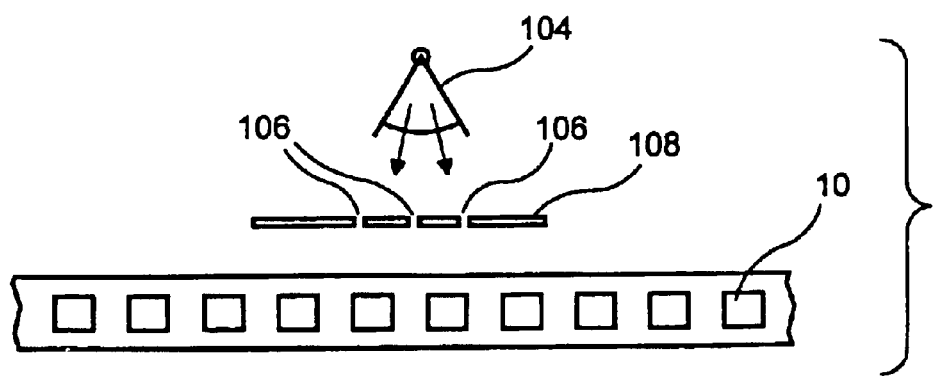
F I G. 5

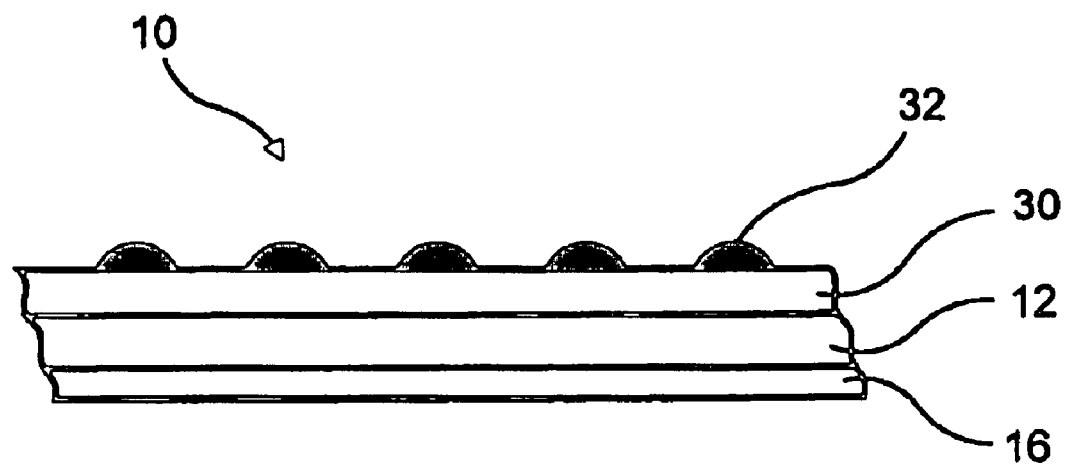
F I G. 6
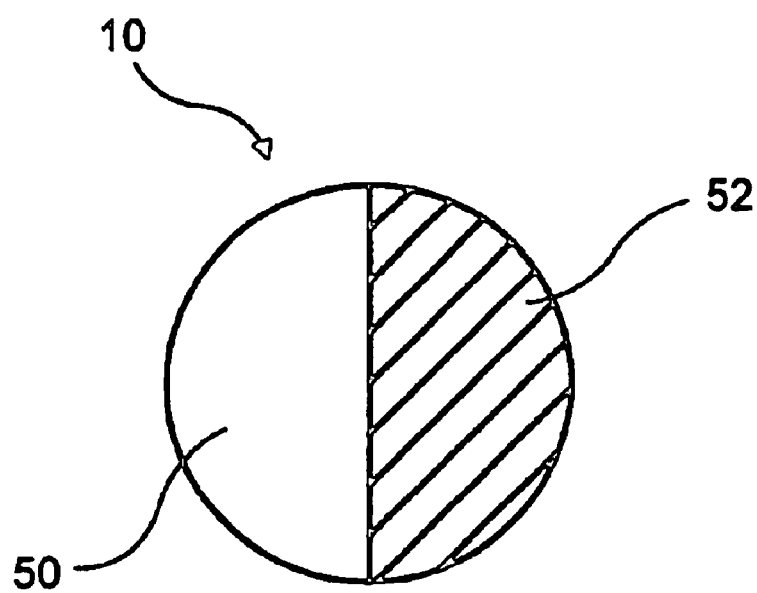
F I G. 7

IN-SITU STANDARD FOR TEMPERATURE INDICATING LABELS

This application claims priority of provisional application serial no. 60/131,615, entitled "An In-Situ Standard for Temperature Indicating Labels" filed on Apr. 28, 1999.

BACKGROUND OF THE INVENTION

1. Field of the Invention

This invention pertains to a temperature indicating label wherein portions of the irreversibly fusible material are pre-fused in order to create an in situ standard or visible pattern. When the label is thereafter exposed to the threshold temperature, the label becomes uniformly fused and the pattern disappears.

2. Description of the Prior Art

Temperature indicating labels, utilizing irreversibly fusible materials, are widely available and produced by several manufacturers. For the most part, they follow the early design of Wahl (U.S. Pat. No. 3,002,385) who laminated fusible materials in an absorptive setting so that once melting occurred a color change took place. In the examples given in the '385 patent the absorptive materials were carbon black, porous paper, or a combination of the two. The change in color was produced by the exposure of a previously hidden object (colored paper) which became visible after melting of the selected fusible masking coating.

As disclosed in the '385 patent, several materials with different melting points could be placed adjacent to one another, so long as they were not in contact, to produce a temperature indicator capable of recording the extent of heating over a range of temperatures. For example, adjacent areas of the device could have materials melting at 100° F., 110° F., 120° F. and 130° F. If the device reached a temperature of 105° F. only the first (100° F.) region would change color. If the first three regions changed color one could assume that the indicator had been to exposed to a temperature greater than 120° F., but less than 130° F.

One advantage this embodiment had over the prior art (Loconti, U.S. Pat. No. 2,928,791) which focused on compositions of matter, was the construction of a label that could be adhered to another object and left in place for an unspecified period of time.

But it these two advantages (multiplicity of temperatures and unspecified holding time) that have subsequently demonstrated deficiencies in the devices as presented today. Indeed this deficiency can be made clear even when multiple temperatures are not presented on the same temperature indicating label.

The utility of an irreversible temperature indicator depends on being able to clearly differentiate between "before" and "after" states of the indicator. That is, one should be able to easily discern the difference between an indicator which contains material that has not passed through a fused state and returned to its solid condition, and an indicator which has fused, and then re-solidified.

The most common form of the indicator label uses a thin coating of fusible opaque material over a colored background. For simplicity, the "before" state can be characterized as "white" while the "after" state is "black". But in practice the initial whiteness depends on many factors including the refractive index of the fusible material, its particle size, the nature of binders and additives used in the coating. The porosity and optical properties of the substrate also contribute to the initial appearance.

This means that there are often lot-to-lot variations in the appearance and performance of any single temperature indicator, which can lead to confusion in the interpretation of the state of the indicator ("before" versus "after"). This degree of uncertainty is particularly high when objects marked with indicators produced at different times are in close proximity to one another. Should one indicator appear less white than that on an adjacent article the observer may be led to conclude that the article has been exposed to a temperature beyond the rating of the label. This "false positive" may lead to costly and erroneous conclusions regarding the state of the object whose temperature must be clearly known.

The opportunity for erroneous conclusions is further enhanced in the case of multiple temperatures being represented on the single indicating label. For example, in the case cited earlier (100° F., 110° F., 120° F., and 130° F.) it is entirely reasonable that the 130° F. portion of the label would be initially less white than the regions comprising the three other temperatures. The conclusion that the label had reached 130° F. may, or may not be correct.

If the object were uniformly heated it is unreasonable to conclude that the 130° F. indicator could signal, leaving the lower temperature indicators unchanged. But the possibility for non-uniform heating also exists, and a reasonable conclusion may be that only the region directly under the 130° F. indicator region did surpass the temperature, leaving the other regions unchanged.

There is yet another deficiency in these products, unrecognized at the time of their first invention and use. That deficiency, the possible sublimation of the fusible coating, is most clearly observed in applications where the temperature indicating label is held for long periods of time at a temperature below the melting point of the fusible compound.

For example, Loconti, in the '791 patent, includes adipic acid in a listing of white crystalline pigments suitable for his invention. The Loconti reference gives the melting point as 135° C.–154° C. and the transition temperature as 146° C. Yet far below these temperatures (86° C. to 133° C. as cited by the Handbook of Chemistry and Physics in the section "Sublimation Pressure for Organic compounds) the material exhibits a significant vapor pressure, which will allow it to sublime.

This will lead to the gradual disappearance of the material from the label surface. Over time this disappearance will lead to darkening, and may finally lead to a situation where the formerly white region becomes indistinguishable from a black region. This means that the signal area can change from "before" to "after" without ever having reached the designated melting point of the material.

The rate at which this transition occurs depends on multiple factors such as coating thickness and label construction as well as the ambient temperature and pressure surrounding the temperature indicating label. If sublimation is unrecognized this phenomenon can lead to faulty interpretation and costly false-positive situations.

As a partial aid to signal interpretation some manufacturers provide an external standard as part of the temperature indicating label. One example is the presence of a printed black circle surrounding the white temperature-responsive area. The intuitive response of the user is to match the appearance of the printed circle with the appearance of the temperature-responsive area within. But because of the nature of the printing process, and the nature of the two surfaces being compared (the temperature responsive surface will be matte, the printed black surface will be glossy)

the external standard can only be a poor approximation of congruent final states.

Other prior art includes U.S. Pat. No. 5,997,927 entitled "Indicator, An Associated Package and Associated Methods" issued on Dec. 7, 1999 to Gics, wherein an indicator scale is printed on the package to permit a user to compare the indicator scale to the label to determine if the fusing has occurred which indicates that the threshold temperature has been reached. This, however, still provides a complicated label which is not intuitive, and may not provide a clear indication of whether or not fusing has occurred if there are variations in the printing of the indicator scale or if sublimation has occurred.

Other prior art includes U.S. Pat. No. 6,042,264 entitled "Time-Temperature Indicator Device and Method of Manufacture" issued on Mar. 28, 2000 to Prusik et al.; U.S. Pat. No. 5,912,204 entitled "Thermosensitive Recording Adhesive Label", issued on Jun. 15, 1999 to Yamada et al.; U.S. Pat. No. 5,795,065 entitled "Temperature-Time-Pressure Detector" issued on Aug. 18, 1998 to Barham; U.S. Pat. No. 5,709,742 entitled "Time-Temperature Indicator Device and Method of Manufacture" issued on Jan. 20, 1998 to Prusik et al.; U.S. Pat. No. 5,476,792 entitled "Time-Temperature Indicator Devices" issued on Dec. 19, 1995 to Ezrielev et al.; U.S. Pat. No. 5,188,457 entitled "Measurement of the Maximum Temperature Attained by an Article" issued on Feb. 23, 1993 to O'Hara; U.S. Pat. No. 4,929,090 entitled "Temperature History Indicating Label" issued on May 29, 1990 to Grahm.

OBJECTS AND SUMMARY OF THE INVENTION

It is therefore an object of the present invention to provide a label which indicates that a maximum temperature has been exceeded.

It is therefore a further object of the present invention to provide a label which quickly and intuitively indicates to a user that a maximum temperature has been exceeded.

It is therefore a still further object of the present invention to provide a label which unambiguously indicates to a user that a maximum temperature has been exceeded.

It is therefore a still further object of the present invention to provide a label which will continue to be functional for at least some period in the event of sublimation of the temperature indicating material.

It is therefore a still further object of the present invention to provide a label which may be used after some sublimation has occurred, without reaching a "false positive" state.

These and other objects are attained by providing a label with irreversibly fusible material which permanently fuses and changes color after exposure to a selected threshold temperature. The label, however, during manufacture, is initially selectively fused in situ in order to create a contrasting pattern between the selectively fused and the unfused portions. This initial selective fusing may be performed by direct contact with a heated surface, such as hot stamping, or by radiant energy from an infra-red lamp. Other methods may be used to create the contrasting pattern, in situ, between the fused and unfused portions.

Alternatively, incompletely obscuring the functional surface of the indicator may be achieved by printed a pattern of fusible material on an absorptive surface which allows a portion of the surface to remain visible. Subsequent melting and fusing of the fusible material would result in the unobscured view of the functional surface of the indicator.

A further alternative is to place a fully coated surface in proximity to wholly uncoated surface during construction of the label. For example, white (coated) and black (uncoated) semicircles could be joined to give the appearance of a half white and half black circle. Subsequent fusing of the coated surface would result in a uniform black appearance.

BRIEF DESCRIPTION OF THE DRAWINGS

Further objects and advantages of the invention will become apparent from the following description and claims, and from the accompanying drawings, wherein:

FIG. 3 is a schematic showing labels of the present invention being selectively fused in situ by a hot stamping method.

FIG. 4 is a schematic showing labels of the present invention being continuously selectively fused in situ by a heated roller.

FIG. 5 is a schematic showing labels of the present invention being selectively fused in situ by a radiant energy method.

FIG. 6 is a cross-sectional view of the embodiment of the label of the present invention wherein the functional surface of the indicator is incompletely obscured by printing a pattern of fusible material on the absorptive surface thereby allowing a portion of the surface to remain visible.

FIG. 7 is a schematic of the embodiment including a coated semi-circle and an uncoated semi-circle forming a circle.

DETAILED DESCRIPTION OF THE PREFERRED EMBODIMENTS

Figure 2:
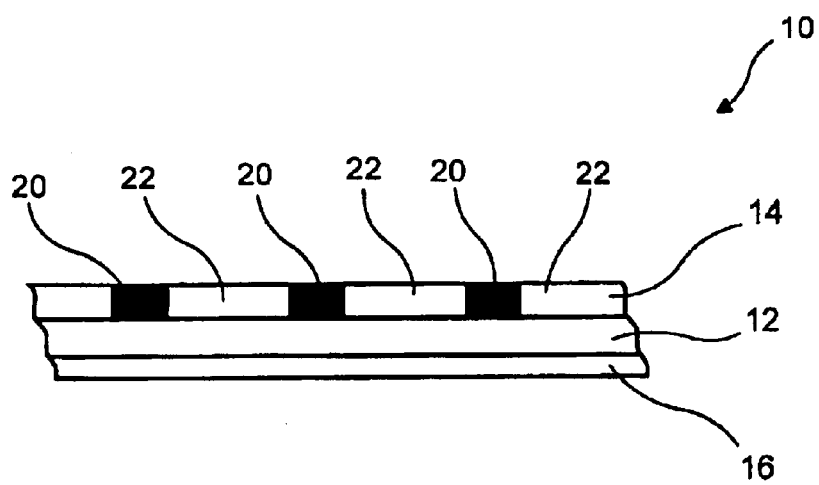
FIG. 2 is a cross-sectional view of the label of the present invention.

Referring now to the drawings in detail wherein like numerals indicate like elements throughout the several views, one sees from FIG. 2 that label or indicator 10 typically comprises support layer 12 with coated layer 14 on the upper surface thereof and an adhesive layer 16 on the lower surface thereof. Support layer 12 is typically made from a paper or plastic material and is adapted to be adhesively secured to an exterior surface of a package (not shown) or similar structure by adhesive layer 16. However, some variations of the label or indicator may omit adhesive layer 16. Coated layer 14 is comprised of an irreversibly fusible material which has a well-defined melting point, as is known in the prior art, typically in the 100–130° F. range (that is, the rated temperature), as is representative of what may be used in the food industry, wherein the reaching of such a temperature would suggest spoilage of the contents of the container. Those skilled in the art, however, will recognize that many equivalents and variations are possible for different applications.

Figure 1:
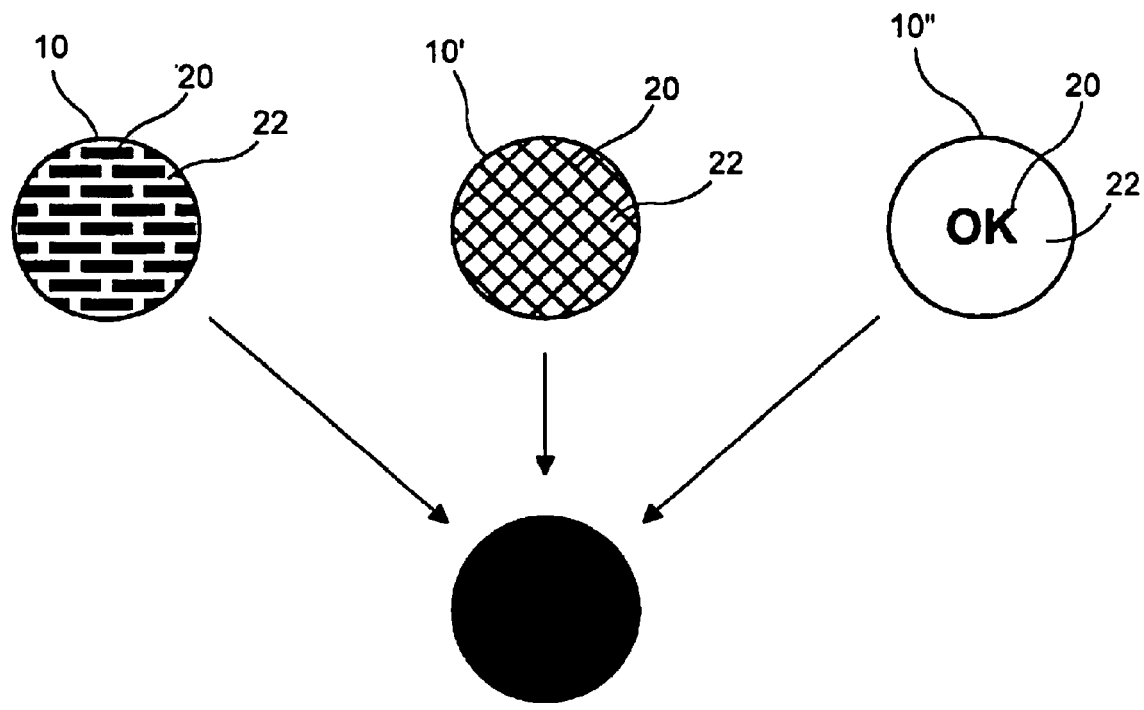
FIG. 1 is a schematic showing three illustrative patterns of the fused and unfused portions of a temperature indicating label of the present invention, further showing the resulting uniformly fused configuration which is permanently reached after the maximum temperature has been achieved.

Typically, the irreversibly fusible material forming coated layer 14 is white if melting and fusing has not occurred. However, upon melting and fusing, the irreversibly fusible material forming coated layer 14 turns black. In order to provide label 10 with unambiguous contrast when a rated temperature or threshold temperature has not been met and to further provide label 10 with unambiguous lack of contrast when a rated temperature or temperature threshold has been met, label 10 has selected portions which are pre-fused in situ so that the pre-fused black portions 20 and the unfused white portions 22 form a visible pattern prior to exposure to the threshold temperature. These patterns are illustrated on labels 10, 10' and 10" of FIG. 1 wherein the pre-fused black portions 20 form dashes (label 10), a grid pattern (label 10') and text such as "OK" or some other text (label 10"). Many other patterns, for example, polka dots, are possible. However, upon subsequent exposure to the threshold temperature, unfused white portions 22 melt and fuse thereby turning black so that labels 10, 10' or 10" turn a uniform black color as shown in FIG. 1.

This provides an internal or in situ standard. According to this in situ standard, the functional or coated surface 14 of the label or indicator 10 includes portions (that is, pre-fused black portions 20) which illustrate the appearance of the label or indicator 10 after the rated temperature has been reached. Moreover, in this embodiment, the in situ standard is a fully signaled region (pre-fused black portions 20) contained within a portion of the unsignaled region (unfused white portions 22) of the indicator or label 10. It is produced by fusing selected portions of the indicating area and allowing it to fuse or re-solidify, in perfect mimicry of the expected behavior of the label or indicator 10 when it reaches the melting point of the fusible indicator.

The pre-fusing or initial fusing of selected portions of coated layer 14 can be performed in many different ways. FIG. 3 illustrates a hot stamp 100 reciprocating so as to strike successive labels 10. Hot stamp 100 includes the desired pattern thereon and impresses this desired pattern onto successive labels 10. FIG. 4 illustrates a hot roller 102 rotating so as to impress the desired pattern on the roller to the successive labels 10. FIG. 5 illustrates a radiant lamp 104 which shines through the slots 106 in a template 108 to selectively strike successive labels 10 thereby forming the pattern formed by slots 106 onto successive labels 10. Radiant lamp 104 may be an infra-red lamp. However, if radiant lamp 104 is implemented as a laser, the beams of light can be sufficiently accurately focused that template 108, in some applications, may be unnecessary.

Other similar embodiments are also envisioned. As shown in FIG. 6, absorptive layer 30 can be formed on the upper surface of support layer 12 (alternatively, absorptive layer 30 and support layer 12 could be integrated into a single layer). A first pattern is printed on the top of absorptive layer 30. A second pattern is printed on top of the absorptive layer 30 (and on top of the first pattern) using irreversibly fusible material 32 thereby at least partially obscuring the first pattern. Therefore, prior to the rated temperature being reached, the second pattern is visible and the first pattern is at least partially obscured. However, when the rated temperature or threshold temperature is reached, the irreversibly fusible material 32 melts and is absorbed into absorptive layer 30 so that the first pattern is visible and the second pattern is obliterated.

Another alternative embodiment is illustrated in FIG. 7 wherein semi-circle 50 is coated with unfused (white) material and is placed next to uncoated black semi-circle 52. When the unfused material of semi-circle 50 subsequently fuses in response to meeting the threshold temperature, both semi-circles 50 and 52 are black.

In all of these embodiments, ambiguity regarding the interpretation of the appearance of the temperature indicating label 10 is eliminated. Exposure to the rated fusible temperature is demonstrated only when the indicating portion of the label is wholly uniform. Similarly, should sublimation of coated layer 14 occur, the onset of sublimation will be indicated by the gradual loss of contrast between the in situ standard (i.e., the pre-fused black portions 20) and the remaining portion of label 10 (i.e., the unfused white portions 22). Because the loss of contrast will not be interpreted as indicated exposure to the rated temperature, the use of label 10 may be extended without reaching the "false positive" state.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A temperature indicating surface comprising:
   a layer of material which substantially irreversibly changes from a first appearance to a second appearance in response to exposure to a threshold temperature, and where said material irreversibly fuses in response to said threshold temperature, wherein a first portion of said layer of material is initially free from exposure to said threshold temperature prior to use by a user and is thereby fusible which provides said first appearance to said first portion, and wherein a second portion of said layer of material is initially exposed to said threshold temperature prior to use by a user and thereby is fused which provides said second appearance to said second portion, whereby said first portion and said second portion form a visible pattern.

2. The temperature indicating surface of claim 1 wherein subsequent exposure of said first and second portions of said layer of material to said threshold temperature produces said second appearance on said first portion, thereby resulting in a uniform appearance of said first and second portions.

3. The temperature indicating surface of claim 1 wherein said layer of material is formed on a label.

4. The temperature indicating surface of claim 3 wherein said label includes a support surface.

5. The temperature indicating surface of claim 4 further including a adhesive layer on said support surface.

6. The temperature indicating surface of claim 1 wherein said visible pattern includes text.

7. The temperature indicating surface of claim 1 wherein said visible pattern includes cross-hatching.

8. The temperature indicating surface of claim 1 wherein said visible pattern includes parallel dashes.

9. The temperature indicating surface of claim 1 wherein said visible pattern includes dots.

10. The temperature indicating surface of claim 1 wherein said second portion of said layer of material is initially exposed to said threshold temperature by direct thermal contact.

11. The temperature indicating surface of claim 1 wherein said second portion of said layer of material is initially exposed to said threshold temperature by indirect thermal contact.

12. A temperature indicating surface including:
    an absorptive layer with a first pattern printed thereon;
    a second pattern printed with irreversibly fusible material on a surface of said absorptive layer over said first pattern, thereby at least partially obscuring said first pattern; and
    wherein said irreversibly fusible material, upon exposure to a threshold temperature, melts and is absorbed into said absorptive layer, thereby exposing said first pattern to view.

13. A temperature indicating surface including a first portion comprised of material that irreversibly fuses upon exposure to a threshold temperature thereby changing from a first appearance to a second appearance, said first portion initially being fusible prior to use by a user to provide said first appearance, and further including a second portion of said material being fused prior to use by a user to provide said second appearance.

14. The temperature indicating surface of claim 13 wherein upon exposure to said threshold temperature, said first portion and said second portion present a substantially uniform second appearance.

* * * * *